US007889189B2

(12) United States Patent
Fujita

(10) Patent No.: US 7,889,189 B2
(45) Date of Patent: Feb. 15, 2011

(54) ELECTROOPTIC DEVICE

(75) Inventor: Shin Fujita, Suwa (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 11/979,520

(22) Filed: Nov. 5, 2007

(65) Prior Publication Data

US 2008/0174577 A1 Jul. 24, 2008

(30) Foreign Application Priority Data

Jan. 19, 2007 (JP) ............................ 2007-009881

(51) Int. Cl.
*G06F 3/038* (2006.01)
*G09G 5/00* (2006.01)
*G02F 1/1333* (2006.01)

(52) U.S. Cl. ........................................ 345/204; 349/40

(58) Field of Classification Search ........... 345/87–104, 345/204; 257/72, 355–363; 349/40; 361/56, 361/111

See application file for complete search history.

(56) References Cited

U.S. PATENT DOCUMENTS 5,956,105 A * 9/1999 Yamazaki et al. ............. 349/43
2003/0030054 A1 * 2/2003 Hector et al. ................. 257/72

FOREIGN PATENT DOCUMENTS

| | | |
|---|---|---|
| JP | A 05-307191 | 11/1993 |
| JP | A-2000-162629 | 6/2000 |
| JP | A-2003-308050 | 10/2003 |
| JP | A 2005-049637 | 2/2005 |

* cited by examiner

*Primary Examiner*—Sumati Lefkowitz
*Assistant Examiner*—Robert E Carter, III
(74) *Attorney, Agent, or Firm*—K&L Gates LLP

(57) ABSTRACT

An electrooptic device includes: a plurality of parallel signal lines provided in a pixel array region in which a plurality of pixels is arrayed; a driving circuit electrically connected to a first end of each of the signal lines outside the pixel array region; and a protection circuit in which a diode device is electrically connected to a second end of the signal line, the diode device dissipating static electricity from the signal line. The resistance of the portion of the signal line from the center of the length to the driving circuit is higher than that of the portion of the signal line from the center to the diode device.

7 Claims, 9 Drawing Sheets

ELECTROOPTIC DEVICE

BACKGROUND

1. Technical Field

The present invention relates to an electrooptic device having a plurality of signal lines and driving circuits inside and outside the pixel array region, respectively, and more particularly, it relates to a technique for protecting the pixel array region and the driving circuits from static electricity flowing into the pixel array region.

2. Related Art

Electrooptic devices such as liquid crystal devices and organic electroluminescent devices have scanning lines and data lines passing through a pixel array region in which a plurality of pixels are arrayed. Electrooptic devices further have driving circuits such as a scanning-line driving circuit and a data-line driving circuit in positions next to the pixel array region. In such electrooptic devices, damage due to electrostatic discharge, that is, static damage sometimes occurs to damage the driving circuits during assembly, mounting a flexible board, or in use after shipment.

Thus, it is proposed to provide a protection circuit for protecting input lines to the driving circuits, output lines from the driving circuits, and power supply lines from static electricity (for example, refer to JP-A-2005-49637).

However, static electricity occurs in various portions of electrooptic devices. For example, when electrostatic discharge occurs in the pixel array region, the static electricity may flow into the scanning-line driving circuit along the scanning lines to cause static damage to the scanning-line driving circuit. Accordingly, it is desirable to provide a static protection circuit for the scanning lines. However, if electrooptic devices are decreased in size without reducing the area of the pixel array region, sufficient space for the protection circuit cannot often be provided between the pixel array region and the scanning-line driving circuit in recent years. Therefore, as shown in FIGS. 9A and 9B, a scanning-line driving circuit 104 and a protection circuit 105 are disposed on both sides of a pixel array region 10*b* and in the direction of the extension of scanning lines 3*a*. The protection circuit 105 has a structure in which diode devices 41 and 42 are electrically connected to each of the scanning lines 3*a*. Even if electrostatic discharge occurs in the position indicated by arrow and the static electricity enters the scanning line 3*a*, the protection circuit 105 with this structure can dissipate the static electricity to a high-potential power line 6*s* or a low-potential power line 6*t* via the diode device 41 or 42, respectively. It is preferable that the protection circuit 105 prevent damage to the diode devices 41 and 42 by reducing the static electricity flowing into the diode devices 41 and 42 with a diode-device protecting resistor 43 between the pixel array region 10*b* and the diode devices 41 and 42.

However, the structure shown in FIGS. 9A and 9B has the problem that, if electrostatic discharge occurs in a position close to the scanning-line driving circuit 104 as shown in FIG. 9A, most of the static electricity flows not to the protection circuit 105 but to the scanning-line driving circuit 104, causing static damage to the scanning-line driving circuit 104. This problem occurs also in the data lines 6*a*.

SUMMARY

An advantage of some aspects of the invention is to provide an electrooptic device in which the driving circuits can be surely protected from static electricity flowing into the pixel array region even with a structure in which driving circuits and a protection circuit are electrically connected to one end and the other end of each signal line passing through the pixel array region.

An electrooptic device according to a first aspect of the invention includes: a plurality of parallel signal lines provided in a pixel array region in which a plurality of pixels is arrayed; a driving circuit electrically connected to a first end of each of the signal lines outside the pixel array region; and a protection circuit in which a diode device is electrically connected to a second end of the signal line, the diode device dissipating static electricity from the signal line. The resistance of the portion of the signal line from the center of the length to the driving circuit is higher than that of the portion of the signal line from the center to the diode device.

In this case, the driving circuit and the protection circuit are electrically connected to a first end and a second of each of the signal lines passing through the pixel array region, respectively, and the resistance of the portion of the signal line from the center of the length to the driving circuit is higher than that of the portion of the signal line from the center to the diode device. Therefore, even if electrostatic discharge occurs in any portion of the pixel array region, the static electricity flows preferentially to the protection circuit and not to the driving circuit. This ensures that the driving circuit is protected from the static electricity flowing into the pixel array region.

To make the resistance of the portion of the signal line from the center of the length to the driving circuit higher than that of the portion of the signal line from the center to the diode device, the following structure may be adopted in addition to changing the resistance of the signal line partially.

An electrooptic device according to a second aspect of the invention includes: a plurality of parallel signal lines provided in a pixel array region in which a plurality of pixels is arrayed; a driving circuit electrically connected to a first end of each of the signal lines outside the pixel array region; a protection circuit in which a diode device is electrically connected to a second end of the signal line, the diode device dissipating static electricity from the signal line; a first resistor at the portion of the signal line between the pixel array region and the diode device; and a second resistor at the portion of the signal line between the pixel array region and the driving circuit, the second resistor having a resistance higher than that of the first resistor.

In this case, a driving circuit and a protection circuit are electrically connected to a first end and a second end of each of the signal lines that passes through the pixel array region, respectively, and the signal line has a first resistor at the portion between the pixel array region and the diode device of the protection circuit, the first resistor reducing rush current to the diode device caused by static electricity. However, the signal line further has a second resistor at the portion between the pixel array region and the driving circuit, the second resistor having a resistance higher than that of the first resistor. Therefore, the resistance of the portion of the signal line from the center of the length to the driving circuit is higher than that of the portion of the signal line from the center to the diode device. Therefore, even if electrostatic discharge occurs in any portion of the pixel array region, the static electricity flows preferentially to the protection circuit through the signal line and not to the driving circuit. This ensures that the driving circuit is protected from the static electricity flowing into the pixel array region.

An electrooptic device according to a third aspect of the invention includes: a plurality of parallel signal lines provided in a pixel array region in which a plurality of pixels is arrayed; a driving circuit electrically connected to a first end of each of the signal lines outside the pixel array region; a first protection circuit in which a first diode device is electrically connected to a second end of the signal line, the first diode device dissipating static electricity from the signal line; a second protection circuit in which a second diode device is electrically connected to the portion of the signal line between the pixel array region and the driving circuit at the first end of the signal line, the second diode device dissipating static electricity from the signal line; a first resistor at the portion of the signal line between the pixel array region and the first diode device; and a second resistor at the portion of the signal line between the pixel array region and the second diode device, the second resistor having a resistance higher than that of the first resistor.

In this case, a driving circuit and a first protection circuit are electrically connected to a first end and a second end of each of the signal lines that passes through the pixel array region, respectively, and the signal line has a first resistor at the portion between the pixel array region and the first diode device of the first protection circuit, the first resistor reducing rush current to the first diode device caused by static electricity. However, the signal line further has a second resistor at the portion between the pixel array region and the driving circuit, the second resistor having a resistance higher than that of the first resistor. Therefore, the resistance of the portion of the signal line from the center of the length to the driving circuit is higher than that of the portion of the signal line from the center to the first diode device. Therefore, even if electrostatic discharge occurs in any portion of the pixel array region, the static electricity flows preferentially to the first protection circuit through the signal line and not to the second protection circuit and the driving circuit. This ensures that the driving circuit is protected from the static electricity flowing into the pixel array region.

It is preferable that the pixel have a pixel-switching thin-film transistor and a pixel electrode; the driving circuit have a complementary thin-film transistor; and the signal line and the diode device be made of a plurality of thin films that constitute the pixel-switching thin-film transistor, the pixel electrode, and the complementary thin-film transistor. It is preferable that the first resistor and the second register be made of a plurality of thin films that constitute the pixel-switching thin-film transistor, the pixel electrode, and the complementary thin-film transistor. This arrangement allows the driving circuit and the pixel array region to be protected from static electricity without adding another thin film.

The diode devices may be PIN junction diodes, MOS diodes having a diode-connected N-type thin-film transistor, and MOS diodes having a diode-connected P-type thin-film transistor. The use of the PIN junction diodes as diode devices only changes the diode devices to insulators and prevents the signal lines from shirt circuit with the static discharging electric path even if the diode devices are damaged by rush current caused by static electricity, allowing the electrooptic device to work normally. When the MOS diode having a diode-connected N-type thin-film transistor and the MOS diode having a diode-connected P-type thin-film transistor are used, a MOS diode can be configured even if the driving circuit is formed of an N-type or P-type thin-film transistor.

Examples of the electrooptic device according to the embodiments of the invention include liquid crystal devices and organic electroluminescent devices. The electrooptic device incorporating the invention can be used for projection display devices, liquid crystal TVs, portable phones, electronic notebooks, word processors, viewfinder or monitor-direct-view type videotape recorders, TV phones, POS terminals, devices having a touch panel, and electronic paper.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
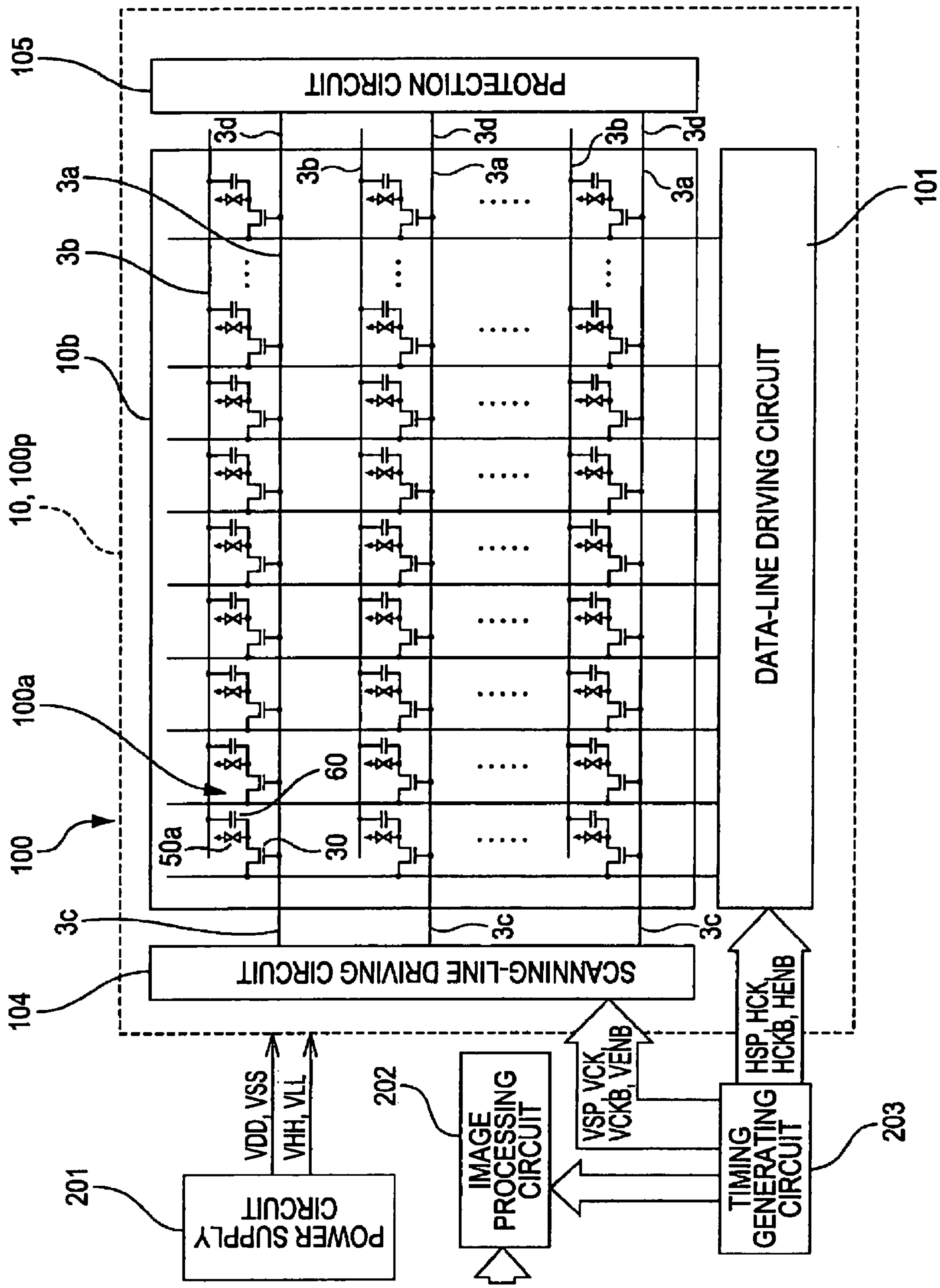
FIG. 1 is a block diagram of the electrical structure of an electrooptic device incorporating the invention.

Embodiments of the invention will be described hereinbelow with reference to the drawings. The following embodiments are electrooptic devices in which the invention is applied to a TFT active matrix driving liquid-crystal device. In the drawings, the scale is different from one layer to another and from one component to another for the convenience of recognition on the drawings. Of the scanning-line driving circuit and the data-line driving circuit, a structure for protecting the scanning-line driving circuit from static electricity will be described with particular emphasis thereon.

First Embodiment

Overall Structure

FIG. 1 is a block diagram of the electrical structure of an electrooptic device incorporating the invention. As shown in FIG. 1, the electrooptic device 100 is principally composed of a liquid crystal panel 100*p*, an image processing circuit 202, a timing generating circuit 203, and a power supply circuit 201. The image processing circuit 202, the timing generating circuit 203, and the power supply circuit 201 include ICs mounted to a flexible board (not shown) connected to the liquid crystal panel 100*p*. The timing generating circuit 203 generates dot clocks for driving the pixels 100*a* of the liquid crystal panel 100*p*, and thus generates clock signals VCK and HCK, inverted clock signals VCKB and HCKB, and transfer starting pulses HSP and VSP according to the dot clocks. When image data is input from an external device, the image processing circuit 202 generates an image signal according to the input image data, and sends it to the liquid crystal panel 100*p*. The power supply circuit 201 generates a plurality of source voltages VDD, VSS, VHH, and VLL, and applies them to the liquid crystal panel 100*p*.

The liquid crystal panel 100*p* has a pixel array region 10*b* in which a plurality of pixels 100*a* is arrayed in matrix form in the center. A device substrate 10, to be described later, of the liquid crystal panel 100*p* has a plurality of data lines 6*a* and a plurality of scanning lines 3*a* extending vertically and horizontally in the pixel array region 10*b*, and has the pixels 100*a* in the intersections thereof. Each of the pixels 100*a* has a thin-film transistor 30 serving as a pixel switching device and a pixel electrode 9*a*. The source of the thin-film transistor 30 is electrically connected to each data line 6*a*. The gate of the thin-film transistor 30 is electrically connected to each scanning line 3*a*. The drain of the thin-film transistor 30 is electrically connected to each pixel electrode 9*a*.

A scanning-line driving circuit 104 and a data-line driving circuit 101 are disposed outside the pixel array region 10*b* of the device substrate 10. The data-line driving circuit 101 is electrically connected to one end of each data line 6*a*, and applies image signals supplied from the image processing circuit 202 to each data line 6*a* in sequence. The scanning-line driving circuit 104 is electrically connected to a first end 3*c* of each scanning line 3*a*, and supplies scanning signals to the scanning line 3*a* in sequence.

In each pixel 100*a*, the pixel electrode 9*a* faces a common electrode formed on a counter substrate 20, to be described later, with liquid crystal in between, to form a liquid crystal capacitor 50*a*. A hold capacitor 60 is disposed in parallel with the liquid crystal capacitor 50*a* to prevent the image signals held in the liquid crystal capacitor 50*a* from leakage. In this embodiment, a capacitor line 3*b* is formed in parallel with the scanning line 3*a* to constitute the hold capacitor 60. The capacitor line 3*b* is connected to a common potential line (not shown) and is held in a predetermined potential. The hold capacitor 60 may be formed between the capacitor line 3*b* and a scanning line 3*a* of the preceding stage.

Structure of Liquid Crystal Panel and Device Substrate

Figure 2A:
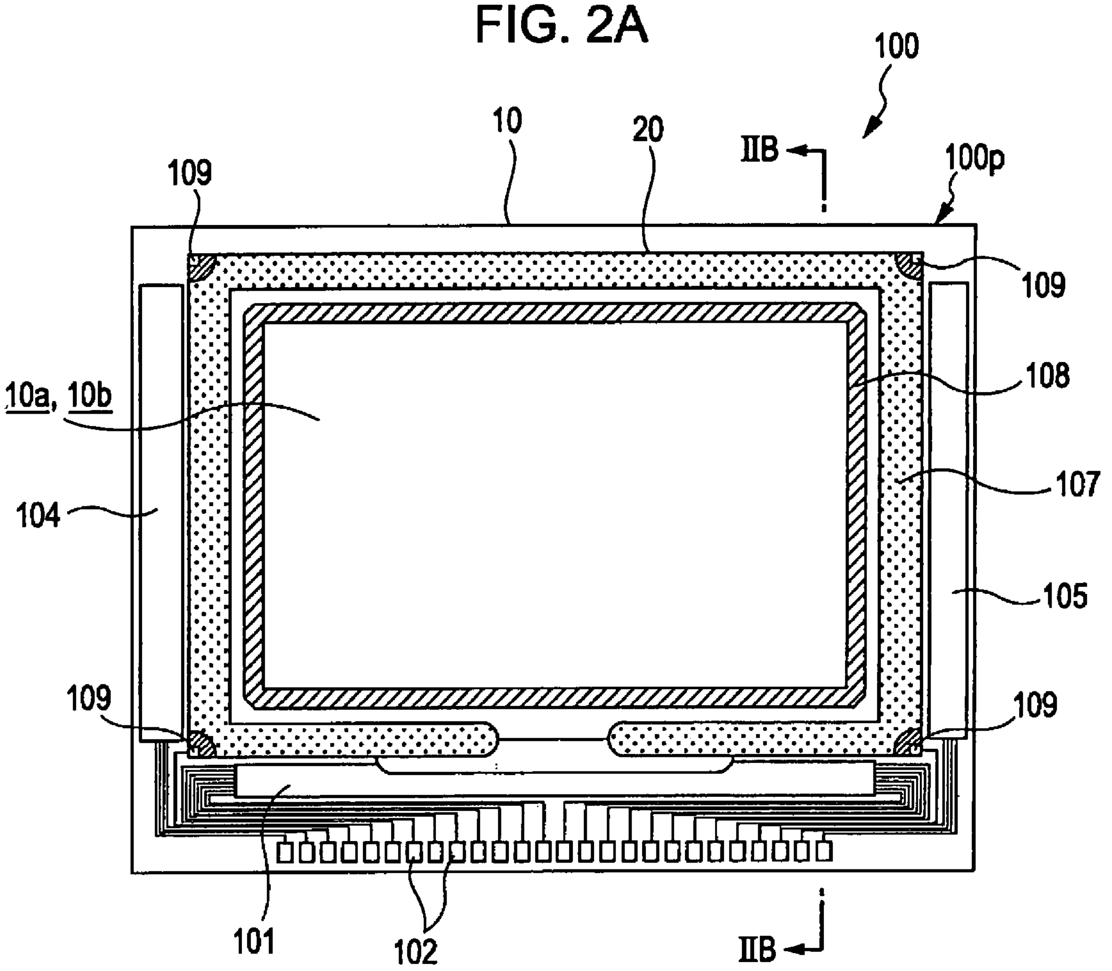
FIG. 2A is a plan view of the electrooptic device incorporating the invention and the components as viewed from the counter substrate
Figure 2B:
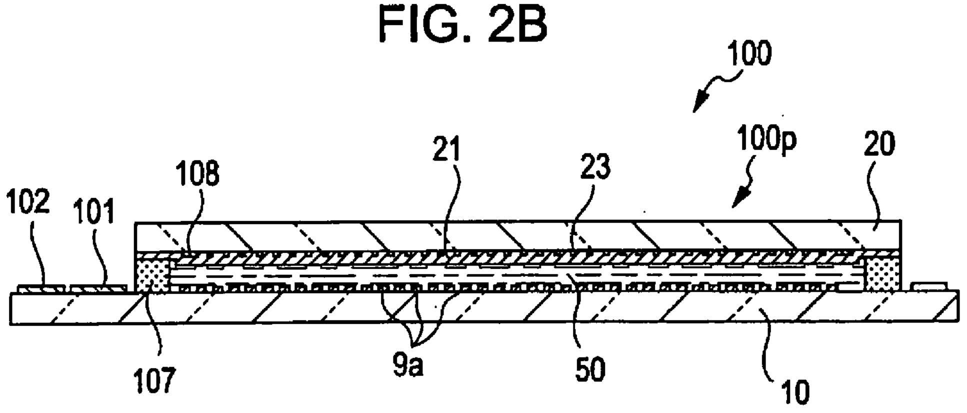
FIG. 2B is a cross-sectional view taken along line IIB-IIB of FIG. 2A.

FIG. 2A is a plan view of the liquid crystal panel 100*p* of the electrooptic device 100 incorporating the invention and the components as viewed from the counter substrate. FIG. 2B is a cross-sectional view taken along line IIB-IIB of FIG. 2A. As shown in FIGS. 2A and 2B, the liquid crystal panel 100*p* of the electrooptic device 100 has a structure in which the device substrate 10 and the counter substrate 20 are bonded together by a sealing member 107 with specified space therebetween. The sealing member 107 is disposed along the edge of the counter substrate 20. The sealing member 107 is an adhesive made of photo-setting resin or thermosetting resin, in which gap members such as glass fibers or glass beads are mixed to keep some distance between the substrates.

The data-line driving circuit 101 and a plurality of terminals 102 are provided outside the sealing member 107 and along a first side of the device substrate 10. The scanning-line driving circuit 104 is disposed along one side next to the first side. There is a protection circuit 105 for protecting the pixel array region 10*b* and the scanning-line driving circuit 104 from static electricity in the position on the device substrate 10 opposed to the scanning-line driving circuit 104 with the pixel array region 10*b* therebetween. There is a vertical conducting material 109 for electrical conduction between the device substrate 10 and the counter substrate 20 at least one of the corners of the counter substrate 20.

The device substrate 10 has the pixel electrodes 9*a* in matrix form, which will be described later in detail. On the other hand, the counter substrate 20 has a frame 108 made of a light-shielding material inside the sealing member 107. Inside the frame 108 is formed an image display region 10*a*. The counter substrate 20 further has a light-shielding film 23 called a black matrix or black stripes in the region facing the vertical and horizontal boundaries of the pixel electrodes 9*a* of the device substrate 10, on which a counter electrode 21 made of indium tin oxide (ITO) is provided. The pixel array region 10*b* may have dummy pixels in the region overlapping the frame 108. In this case, the area of the pixel array region 10*b* except the dummy pixels is used as the image display region 10*a*.

The electrooptic device 100 with this structure can be used as a color display device of electrooptic devices such as mobile computers, portable phones, and liquid-crystal TVs, to be described later. In this case, the counter substrate 20 is provided with a color filter (not shown) and a protective film. The light-incident surface or the light-exiting surface of the counter substrate 20 and the device substrate 10 are provided with a polarizing film, a retarder film, or a polarizer disposed in a specified direction according to the type of liquid crystal 50 used, that is, the operation mode, such as a twisted nematic (TN) mode or a super TN (STN) mode and a normally white mode or a normally black mode. The electrooptic device 100 may be of not only a transmissive type but also a reflection type or a semitransparent reflection type. In this case, for example, the device substrate 10 is provided with a light reflecting layer. The electrooptic device 100 can be used as RGB light valves of projection display devices (liquid crystal projectors). In this case, the electrooptic devices 100 for RGB have no color filter because RGB lights separated by RGB separating dichroic mirrors enter the electrooptic devices 100 for RGB, respectively. Moreover, if the counter substrate 20 is provided with microlenses corresponding to the pixels, the light-condensing efficiency of the pixel electrodes 9*a* can be improved, allowing light display. Furthermore, multiple interference layers with different refraction indexes may be formed on the counter substrate 20 as a dichroic filter for forming RGB colors using the light interference action. The counter substrate with this dichroic filter allows lighter color display.

Structure of Pixel

Figure 3A:
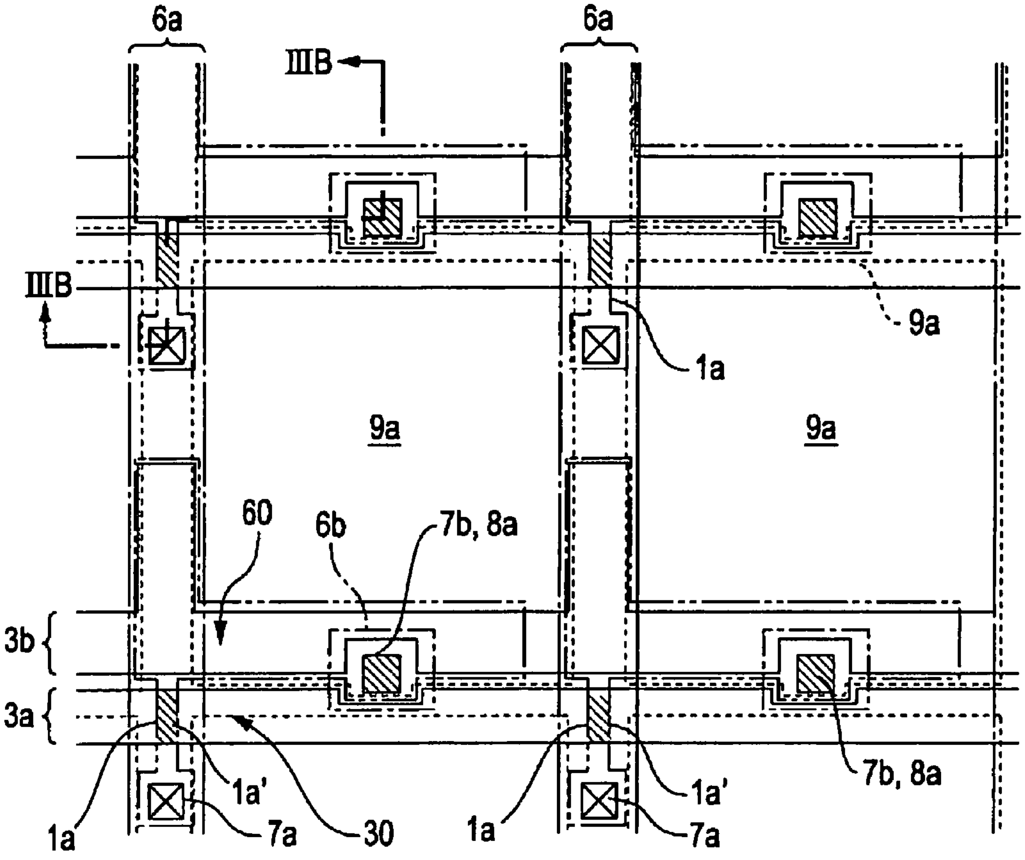
FIG. 3A is a plan view of adjacent pixels on a device substrate used in the electrooptic device incorporating the invention.
Figure 3B:
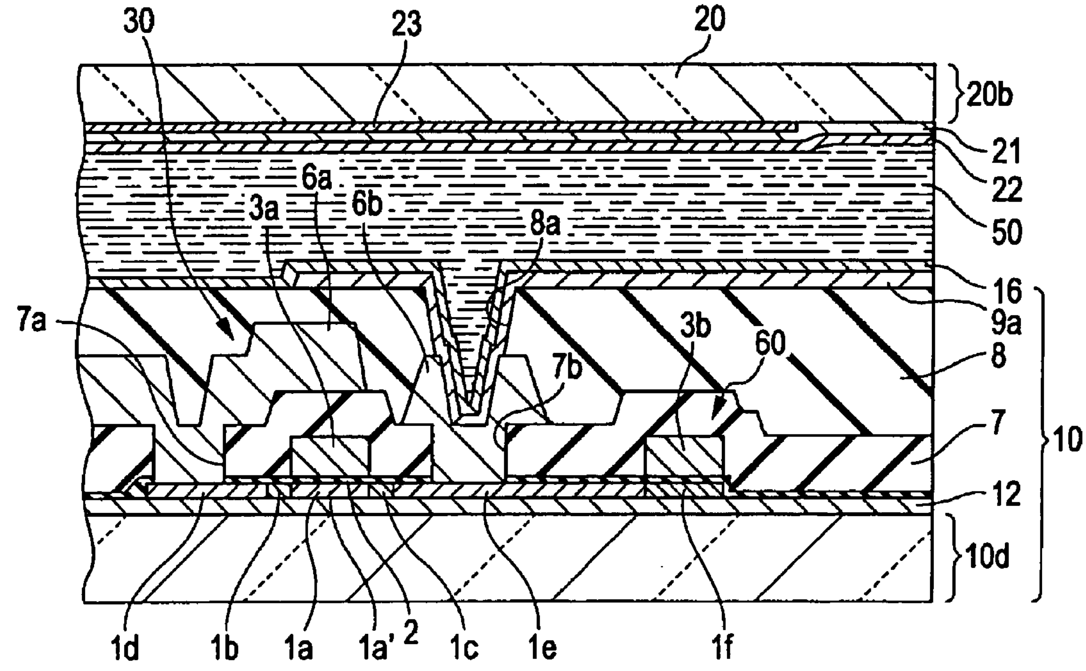
FIG. 3B is a cross-sectional view of the electrooptic device taken along line IIIB-IIIB of FIG. 3A.

FIG. 3A is a plan view of adjacent pixels on the device substrate 10 used in the electrooptic device 100 incorporating the invention. FIG. 3B is a cross-sectional view of the electrooptic device 100 taken along line IIIB-IIIB of FIG. 3A.

As shown in FIGS. 3A and 3B, the device substrate 10 has a base protective film 12 made of silicon oxide on the surface of a transparent substrate 10*d* made of glass or the like, on which an N-channel thin-film transistor 30 is formed in the position next to the pixel electrode 9*a*. The thin-film transistor 30 has a lightly doped drain (LDD) structure in which a channel region 1*a*', a lightly doped source region 1*b*, a heavily doped source region 1*d*, a lightly doped drain region 1*c*, and a heavily doped drain region 1*e* are formed in an island-like semiconductor film 1*a*.

The semiconductor film 1*a* is a polysilicon film formed in such a manner that an amorphous silicon film is formed on the device substrate 10 and then polycrystallized by laser annealing or lamp annealing. The lightly doped source region 1*b* and the lightly doped drain region 1*c* are semiconductor regions doped with, for example, low-concentration N-type impurity ions (phosphorous ions) of an amount from about $0.1\times10^{13}/cm^2$ to $10\times10^{13}/cm^2$ using the scanning line 3*a* as a mask. The heavily doped source region 1*d* and the heavily doped drain region 1*e* are semiconductor regions doped with high-concentration N-type impurity ions (phosphorous ions) of an amount from about $0.1\times10^{15}/cm^2$ to $10\times10^{15}/cm^2$ using a resist mask.

Interlayer insulator films 7 and 8 are formed on the thin-film transistor 30. On the surface of the interlayer insulator film 7 is provided the data line 6*a*. The data line 6*a* is electrically connected to the heavily doped source region 1*d* via a contact hole 7*a* of the interlayer insulator film 7. On the surface of the interlayer insulator film 8 is provided the pixel electrode 9*a* made of an ITO film. The pixel electrode 9*a* is electrically connected to the drain electrode 6*b* via a contact hole 8*a* of the interlayer insulator film 8. The drain electrode 6*b* is electrically connected to the heavily doped drain region 1*e* via a contact hole 7*b* of the interlayer insulator film 7 and a gate insulator film 2. On the surface of the pixel electrode 9*a* is provided an alignment film 16 made of polyimide. The capacitor line 3*b* in the same layer as the scanning line 3*a* is opposed, as an upper electrode, to a portion 1*f* (lower electrode) extending from the heavily doped drain region 1*e* with an insulator film (dielectric film) formed at the same time as the gate insulator film 2 therebetween to constitute the hold capacitor 60. In this embodiment, the scanning line 3*a* and the capacitor line 3*b* are each a single layer of molybdenum, aluminum, titanium, tungsten, or tantalum or a laminate thereof. The data line 6*a* and the drain electrode 6*b* are each a single layer of molybdenum, aluminum, titanium, tungsten, or tantalum or a laminate thereof.

The device substrate 10 and the counter substrate 20 with this structure are disposed such that the pixel electrodes 9*a* and the counter electrode 21 face each other, between which the liquid crystal 50 serving as an electrooptic material is sealed in the space enclosed by the sealing member 107 (see FIGS. 2A and 2B). The liquid crystal 50 is aligned in a predetermined orientation by the alignment films 16 and 22 in a state in which no electric field is applied from the pixel electrodes 9*a*. The liquid crystal 50 is one or a mixture of several kinds of nematic liquid crystals.

Structure of Driving Circuit

Figure 4A:
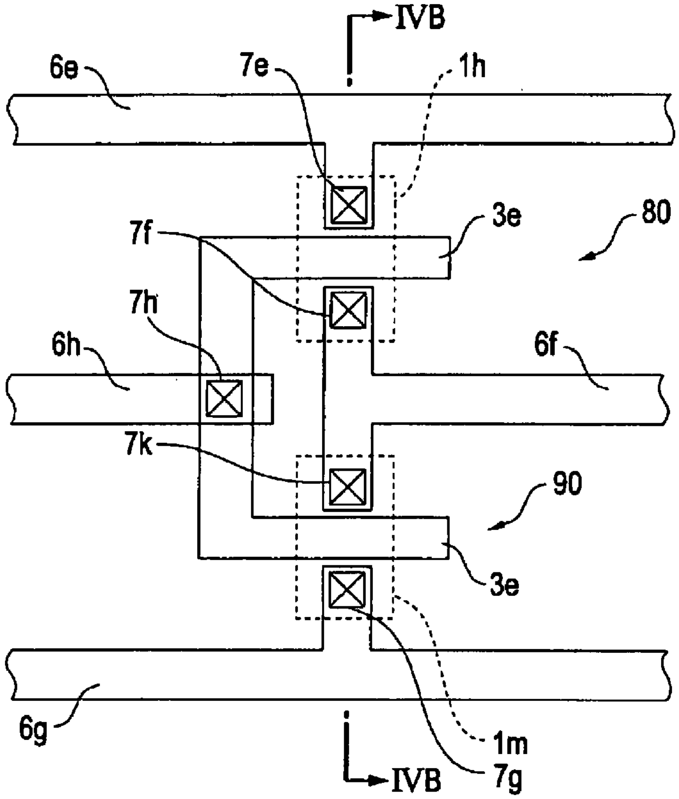
FIG. 4A is a plan view of a complementary thin-film transistor formed on the device substrate used in the electrooptic device incorporating the invention.
Figure 4B:
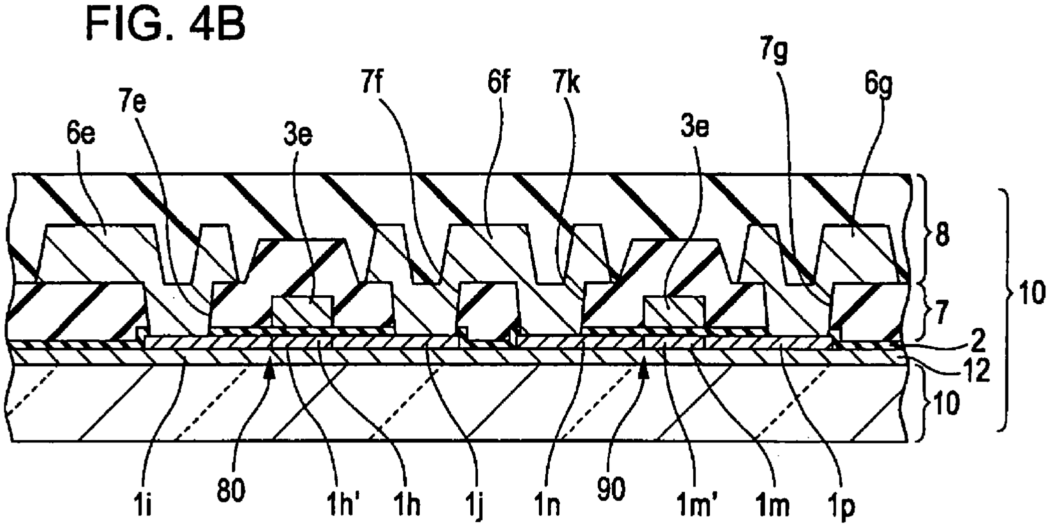
FIG. 4B is a cross-sectional view taken along line IVB-IVB of FIG. 4A.

Referring again to FIG. 2A, in the electrooptic device 100 of this embodiment, the internal circuits including the data-line driving circuit 101 and the scanning-line driving circuit 104 are formed on the region of the surface of the device substrate 10 around the pixel array region 10*b*. As shown in FIGS. 4A and 4B, the data-line driving circuit 101 and the scanning-line driving circuit 104 have a complementary circuit including a P-channel thin-film transistor 80 and an N-channel thin-film transistor 90. This complementary circuit will be described briefly. FIG. 4A is a plan view of a complementary thin-film transistor formed on the device substrate used in the electrooptic device incorporating the invention. FIG. 4B is a cross-sectional view taken along line IVB-IVB of FIG. 4A.

In FIGS. 4A and 4B, the transistor of the driving circuit is a complementary thin-film transistor composed of the P-channel thin-film transistor 80 and the N-channel thin-film transistor 90. These thin-film transistors 80 and 90 are formed by using part of the process of manufacturing the pixel-switching thin-film transistor 30. The respective semiconductor films 1*h* and 1*m* of the thin-film transistors 80 and 90 are polysilicon films formed at the same time as the semiconductor film 1*a* of the thin-film transistor 30.

The N-channel thin-film transistor 90 has an N-type heavily doped source region 1*p* and heavily doped drain region 1*n* on both sides of a channel region 1*m*'. The heavily doped source region 1*p* and the heavily doped drain region 1*n* are semiconductor regions doped with N-type high-concentration impurity ions of an amount from about $0.1\times10^{15}/cm^2$ to about $10\times10^{15}/cm^2$ using the gate electrode 3*e* as a mask when the heavily doped source region 1*d* and the heavily doped drain region 1*e* of the thin-film transistor 30 are formed. The thin-film transistor 90 may be formed in an LDD structure or a multigate structure.

The P-channel thin-film transistor 80 has a P-type heavily doped source region 1*i* and heavily doped drain region 1*j* on both sides of a channel region 1*h*'. The heavily doped source region 1*i* and the heavily doped drain region 1*j* are semiconductor regions doped with P-type high-concentration impurity ions (boron ions) of an amount from about $0.1\times10^{15}/cm^2$ to about $10\times10^{15}/cm^2$ using the gate electrode 3*e* as a mask. The thin-film transistor 80 may also be formed in an LDD structure or a multigate structure.

In the thin-film transistors 80 and 90, a high potential line 6*e* and a low potential line 6*g* are electrically connected to the heavily doped source regions 1*i* and 1*p* of the semiconductor films 1*h* and 1*m* via contact holes 7*e* and 7*g*, respectively, the contact holes 7*e* and 7*g* passing through the interlayer insulator film 7 and the gate insulator film 2. An output line 6*f* is electrically connected to the heavily doped drain regions 1*j* and 1*n* of the semiconductor films 1*h* and 1*m* via contact holes 7*f* and 7*k*, respectively, the contact holes 7*f* and 7*k* passing through the interlayer insulator film 7 and the gate insulator film 2. An input line 6*h* is connected to the common gate electrode 3*e* via a contact hole 7*g* passing through the interlayer insulator film 7.

In this embodiment, the gate electrode 3*e* is a metal film formed at the same time as the scanning line 3*a* and the capacitor line 3*b*, and is a single layer of molybdenum, aluminum, titanium, tungsten, or tantalum or a laminate thereof. The high potential line 6*e*, the output line 6*f*, the low potential line 6*g*, and the input line 6*h* are metal films formed at the same time as the data line 6*a* and the drain electrode 6*b*, and are each a single layer of molybdenum, aluminum, titanium, tungsten, or tantalum or a laminate thereof.

Structure of Scanning-Line Driving Circuit

Figure 5A:
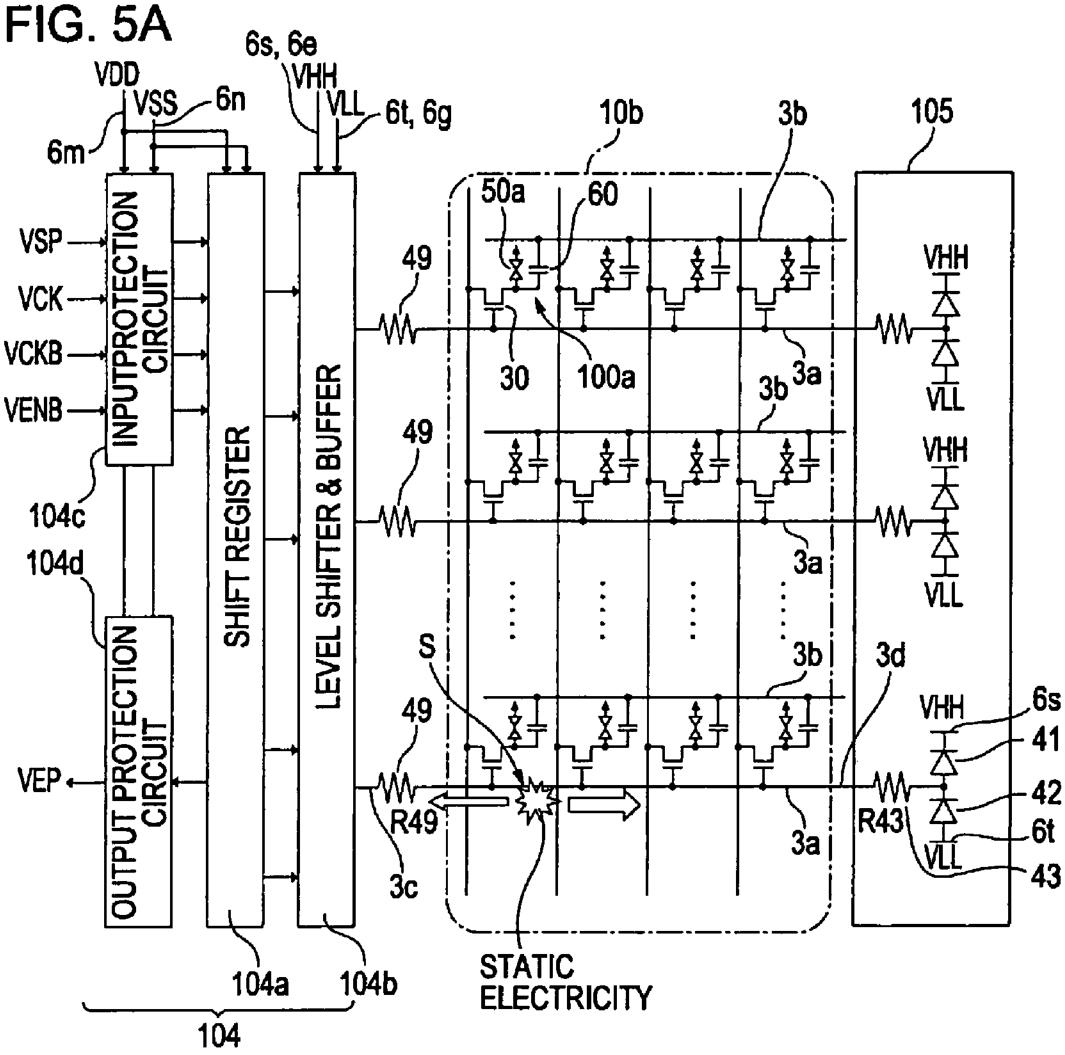
FIG. 5A is a block diagram of the scanning-line driving circuit and the protection circuit of an electrooptic device according to a first embodiment of the invention.
Figure 5B:
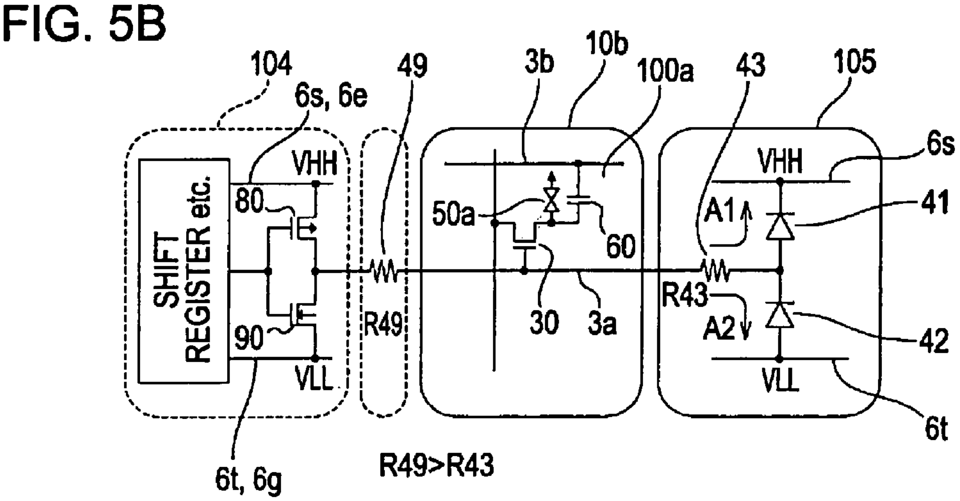
FIG. 5B is a block diagram of one unit of FIG. 5A.

Referring to FIGS. 5A and 5B, the structure of the scanning-line driving circuit 104 will be described. FIG. 5A is a block diagram of the scanning-line driving circuit 104 and the protection circuit 105 formed on the device substrate 10 of the electrooptic device 100, and FIG. 5B is a block diagram of its one unit.

As shown in FIGS. 5A and 5*b*, the scanning-line driving circuit 104 includes a shift register 104*a* and a level shifter and buffer 104*b*. To the shift register 104*a* are input the clock signal VCK, the inverted clock signal VCKB, the transfer start pulse VSP, etc. When the transfer start pulse VSP is input, the shift register 104*a* generates transfer pulses in sequence in synchronism with the clock signal VCK and the inverted clock signal VCKB. In this embodiment, the shift register 104*a* has m stages corresponding to m scanning lines 3*a*, and outputs transfer pulses in the direction from the first stage to the mth stage. The shift register 104*a* outputs a transfer pulse from the last stage as an end pulse YEP. The level shifter and buffer 104*b* also has m stages corresponding to the m scanning lines 3*a*. The transfer pulses that are output from the shift register 104*a* in sequence are input to the level shifter and buffer 104*b*, in which they are shifted in voltage level, and output to the scanning lines 3*a* as scanning signals.

To the scanning-line driving circuit 104 are provided with first source voltage VDD, second source voltage VSS, third source voltage VHH, and fourth source voltage VLL from the power supply circuit 201 shown in FIG. 1. Accordingly, the scanning-line driving circuit 104 is electrically connected to power lines including a first power line 6*m* for supplying the first source voltage VDD, a second power line 6*n* for supplying the second source voltage VSS, a third power line 6*s* for supplying the third source voltage VHH, and a fourth power line 6*t* for supplying the fourth source voltage VLL. The first power line 6*m* and the second power line 6*n* are electrically connected to the shift register 104*a*, so that the shift register 104*a* is driven by the first source voltage VDD and the second source voltage VSS. The third power line 6*s* and the fourth power line 6*t* are electrically connected to the level shifter and buffer 104*b*, so that the level shifter and buffer 104*b* is driven by the third source voltage VHH (high potential) and the fourth source voltage VLL (low potential). Therefore, the third source voltage VHH has the highest potential used in the liquid crystal panel 100*p*, and the fourth source voltage VLL has the lowest potential used in the liquid crystal panel 100*p*. The level shifter and buffer 104*b* has the complementary thin-film transistor (the P-channel thin-film transistor 80 and the N-channel thin-film transistor 90) described with reference to FIGS. 4A and 4B. In this complementary thin-film transistor, the third power line 6*s* corresponds to the high potential line 6*e*, and the fourth power line 6*t* corresponds to the low potential line 6*g* shown in FIGS. 4A and 4B.

Static Protection for Pixel array region and Scanning-Line Driving Circuit

In the electrooptic device 100 with this structure, if electrostatic discharge to the device substrate 10 occurs during assembly of the liquid crystal panel 100*p*, in an inoperative state during transportation or the like, or in an operative state during power supply, the pixels 100*a* can be damaged. If static electricity that has entered the pixel array region 10*b* flows into the scanning line 3*a*, the level shifter and buffer 104*b* in the scanning-line driving circuit 104 electrically connected to the first end 3*c* of the scanning line 3*a* can be damaged or degraded.

Thus, as shown in FIGS. 5A and 5*b*, this embodiment is provided with the protection circuit 105 for the pixel array region 10*b* and the scanning-line-driving circuit 104 in the region opposite to the scanning-line driving circuit 104 with respect to the pixel array region 10*b*. The protection circuit 105 is electrically connected to a second end 3*d* of each of the scanning lines 3*a*.

In this embodiment, the protection circuit 105 has the third power line 6*s* for supplying the third source voltage VHH and the fourth power line 6*t* for supplying the fourth source voltage VLL as electrostatic discharging electric paths. Between the second end 3*d* of the scanning line 3*a* and the third power line 6*s* is provided a diode device 41. Between the second end 3*d* of the scanning line 3*a* and the fourth power line 6*t* is disposed a diode device 42. Of the two diode devices 41 and 42, the anode of the diode device 41 is electrically connected to the scanning line 3*a* and the cathode is connected to the third power line 6*s* (the third source voltage VHH). In contrast, the cathode of the diode device 42 is electrically connected to the scanning line 3*a* and the anode is connected to the fourth power line 6*t* (the fourth source voltage VLL). In this embodiment, a first resistor 43 for reducing rush current to the diode devices 41 and 42 is disposed at the portion of the second end 3*d* of the scanning line 3*a* between the pixel array region 10*b* and the diode devices 41 and 42.

This embodiment further has a second resistor 49 at the first end 3*c* of the scanning line 3*a* between the pixel array region 10*b* and the scanning-line-driving circuit 104. The resistance R49 of the second resistor 49 is higher than the resistance R43 of the first resistor 43. Moreover, the scanning line 3*a* is equal in material and line width in the longitudinal direction, so that the resistance per unit length is nearly constant in the longitudinal direction of the scanning line 3*a*. Accordingly, the resistance of the portion of the scanning line 3*a* from the center of the length to the scanning-line driving circuit 104 is higher than that from the center of the scanning line 3*a* to the diode devices 41 and 42.

The diode devices 41 and 42 of the embodiment are PIN junction diodes formed by implanting N-type impurities and P-type impurities into a predetermined region of the semiconductor film when manufacturing the thin-film transistor 30, the P-channel thin-film transistor 80, and the N-channel thin-film transistor 90, described with reference to FIGS. 3 and 4. That is, the diode devices 41 and 42 have a structure in which an N-type region, an intrinsic region, and P-type region are formed in that order in the semiconductor film. The first resistor 43 and the second resistor 49 are resistor devices formed by implanting low-concentration N-type impurities or low-concentration P-type impurities into the semiconductor film when manufacturing the thin-film transistor 30, the P-channel thin-film transistor 80, and the N-channel thin-film transistor 90, described with reference to FIGS. 3 and 4. Setting the length and width as conditions allows the first resistor 43 and the second resistor 49 to be set at predetermined resistance.

In the electrooptic device 100 with this structure, when electrostatic discharge occurs in the pixel array region 10*b* as indicated by arrow S of FIG. 5A, the static electricity flows into the scanning line 3*a*. In this case, the scanning-line driving circuit 104 and the protection circuit 105 are electrically connected to the first end 3*c* and the second end 3*d* of the scanning line 3*a*, respectively, the first resistor 43 is disposed at the scanning line 3*a* between the pixel array region 10*b* and the diode devices 41 and 42 of the protection circuit 105, and the second resistor 49 whose resistance is higher than that of the first resistor 43 is disposed between the pixel array region 10*b* and the scanning-line driving circuit 104. Therefore, the resistance of the scanning line 3*a* from the center of the length to the scanning-line driving circuit 104 is higher than that of the scanning line 3*a* from the center of length to the diode devices 41 and 42. Accordingly, even if static electricity flows into the scanning line 3*a*, the static electricity flows preferentially to the protection circuit 105 along the scanning line 3*a* and little static electricity flows to the scanning-line driving circuit 104. In the protection circuit 105, when static electricity having a potential higher than the potential (the third source voltage VHH) of the third power line 6*s* is applied to the scanning line 3*a*, the static electricity is dissipated from the scanning line 3*a* to the third power line 6*s* via the diode device 41 as indicated by arrow A1. When static electricity having a potential lower than the potential (the fourth source voltage VLL) of the fourth power line 6*t* is applied to the scanning line 3*a*, the static electricity is dissipated from the scanning line 3*a* to the fourth power line 6*t* via the diode device 42 as indicated by arrow A2. Therefore, the embodiment allows the pixel array region 10*b* to be protected from the static electricity that has entered the pixel array region 10*b* and allows also the scanning-line driving circuit 104 to be protected.

The portion of the scanning line 3*a* between the pixel array region 10*b* and the diode devices 41 and 42 has the first resistor 43 that reduces rush current to the diode devices 41 and 42 due to static electricity, which prevents the diode devices 41 and 42 from electrostatic damage.

Even if high current due to static electricity flows through the diode devices 41 and 42 to damage them, they only change to insulators because the diode devices 41 and 42 are composed of only a PIN joint diode, allowing the electrooptic device 100 to work normally.

In this embodiment, the diode devices 41 and 42 and the resistors 43 and 49 are made of the thin films of the thin-film transistor 30, 80, and 90. This allows the scanning-line driving circuit 104 and the pixel array region 10*b* to be protected from static electricity without adding another thin film.

Input Protection Circuit and Output Protection Circuit

The electrooptic device 100 of this embodiment has an input protection circuit 104*c* at the input terminals of the scanning-line driving circuit 104 to which external signals are input and an output protection circuit 104*d* at the output terminal of the scanning-line driving circuit 104 from which a signal is output to the exterior. Thus, the input protection circuit 104*c* protects the shift register 104*a* by providing lines electrically connected to the input terminals with paths for dissipating static electricity. The output protection circuit 104*d* protects the shift register 104*a* by providing a line electrically connected to the output terminal with a path for dissipating static electricity. The concrete structures of the input protection circuit 104*c* and the output protection circuit 104*d* are omitted here because they are the same as that of the protection circuit 105. Of the two diode devices, the cathode and anode of one diode device are connected to a high potential line and an input/output line, respectively, and the anode and cathode of the other diode device are connected to a low potential line and an input/output line, respectively.

Second Embodiment

Figure 6:
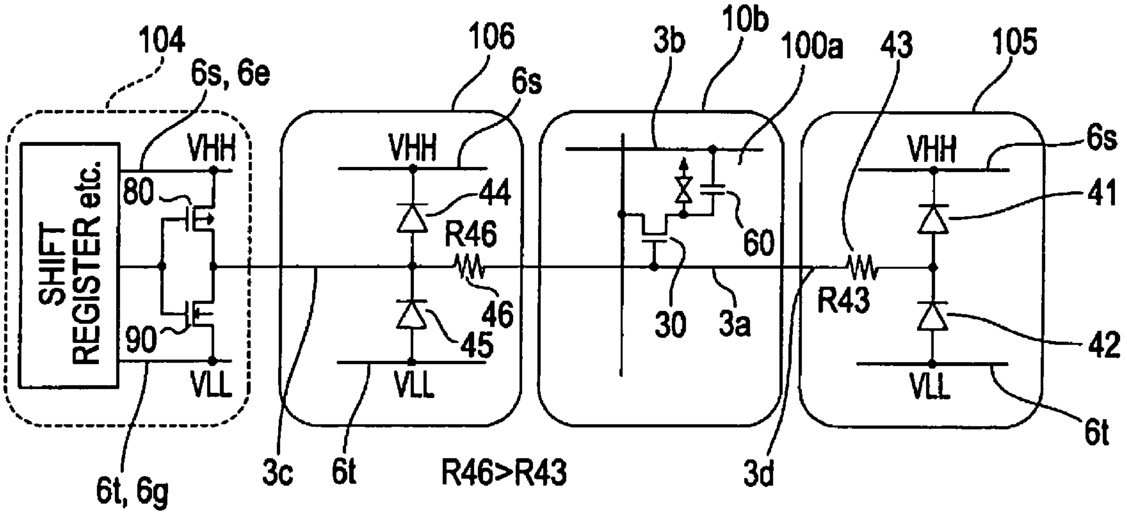
FIG. 6 is a block diagram of one unit of the scanning-line driving circuit and the protection circuit of an electrooptic device according to a second embodiment of the invention.

FIG. 6 is a block diagram of one unit of the scanning-line driving circuit 104 and the protection circuit 105 formed on the device substrate 10 of an electrooptic device according to a second embodiment of the invention. Since the basic configuration of this embodiment is the same as that of the first embodiment, like component are given the same numerals and their description will be omitted.

As shown in FIG. 6, also in this embodiment, the protection circuit 105 (a first protection circuit) for the pixel array region 10*b* and the scanning-line driving circuit 104 is disposed in the region opposite to the scanning-line driving circuit 104 with respect to the pixel array region 10*b*, and the protection circuit 105 is electrically connected to the second end 3*d* of the scanning line 3*a*. That is, the protection circuit 105 has the third power line 6*s* for supplying the third source voltage VHH and the fourth power line 6*t* for supplying the fourth source voltage VLL as electrostatic discharging electric paths. Between the second end 3*d* of the scanning line 3*a* and the third power line 6*s* and between the second end 3*d* of the scanning line 3*a* and the fourth power line 6*t* are provided diode devices 41 and 42 (a first diode device), respectively. This embodiment has a first resistor 43 for reducing rush current to the diode devices 41 and 42 at the second end 3*d* of the scanning line 3*a* and between the pixel array region 10*b* and the diode devices 41 and 42.

This embodiment further includes a protection circuit 106 (a second protection circuit) for the pixel array region 10*b* and the scanning-line driving circuit 104 between the pixel array region 10*b* and the scanning-line driving circuit 104. The protection circuit 106 is electrically connected to the first end 3*c* of the scanning line 3*a*. That is, the protection circuit 106 has the third power line 6*s* for supplying the third source voltage VHH and the fourth power line 6*t* for supplying the fourth source voltage VLL as electrostatic discharging electric paths. Between the first end 3*c* of the scanning line 3*a* and the third power line 6*s* and between the first end 3*c* of the scanning line 3*a* and the fourth power line 6*t* are provided diode devices 44 and 45 (a second diode device), respectively.

This embodiment has a second resistor 46 for reducing rush current to the diode devices 44 and 45 at the first end 3*c* of the scanning line 3*a* and between the pixel array region 10*b* and the diode devices 44 and 45.

The resistance R46 of the second resistor 46 is higher than the resistance R43 of the first resistor 43. Moreover, the scanning line 3*a* is equal in material and line width in the longitudinal direction, so that the resistance per unit length is nearly constant in the longitudinal direction of the scanning line 3*a*. Accordingly, the resistance of the portion of the scanning line 3*a* from the center of the length to the scanning-line driving circuit 104 is higher than that from the center of the scanning line 3*a* to the diode devices 41 and 42.

Like the diode devices 41 and 42, these diode devices 44 and 45 are PIN junction diodes formed by implanting N-type impurities and P-type impurities into a predetermined region of the semiconductor film when manufacturing the thin-film transistor 30, the P-channel thin-film transistor 80, and the N-channel thin-film transistor 90, described with reference to FIGS. 3 and 4. That is, the diode devices 44 and 45 have a structure in which an N-type region, an intrinsic region, and P-type region are formed in that order in the semiconductor film. The first resistor 43 and the second resistor 46 are resistor devices formed by implanting low-concentration N-type impurities or low-concentration P-type impurities into the semiconductor film when manufacturing the thin-film transistor 30, the P-channel thin-film transistor 80, and the N-channel thin-film transistor 90, described with reference to FIGS. 3 and 4. Setting the length and width as conditions allows the first resistor 43 and the second resistor 46 to be set at predetermined resistance.

In the electrooptic device 100 with this structure, as in the first embodiment, even if static electricity enters the scanning line 3*a*, the static electricity preferentially flows to the protection circuit 105 along the scanning line 3*a* and little static electricity flows to the scanning-line driving circuit 104. The static electricity flowing to the scanning-line driving circuit 104 is discharged via the protection circuit 106. Therefore, this embodiment allows the pixel array region 10*b* to be protected from the static electricity flowing into the pixel array region 10*b*, and also the scanning-line driving circuit 104 to be protected.

Third Embodiment

Figure 7:
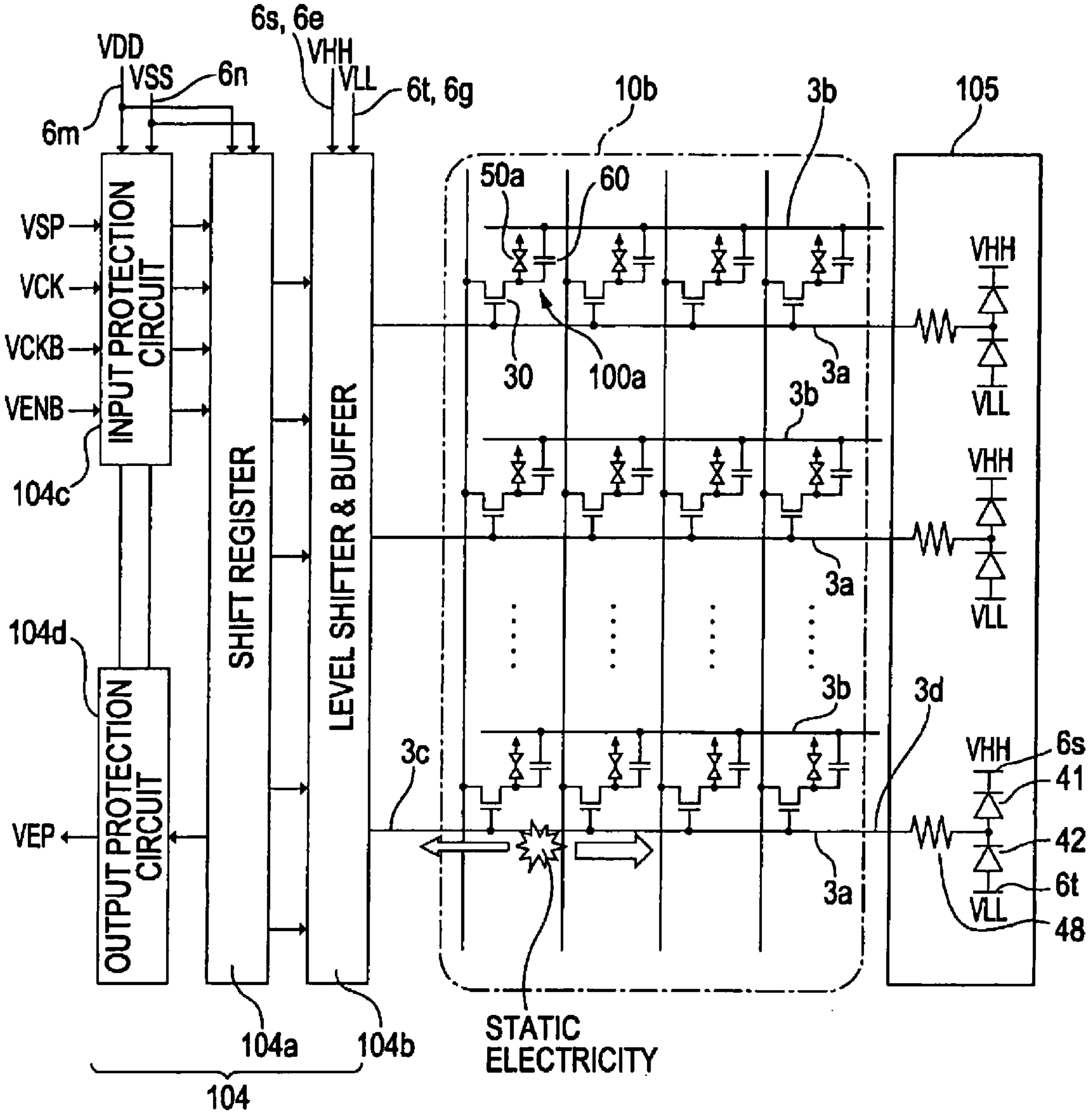
FIG. 7 is a block diagram of the scanning-line driving circuit and the protection circuit of an electrooptic device according to a third embodiment of the invention.

FIG. 7 is a block diagram of the scanning-line driving circuit 104 and the protection circuit 105 formed on the device substrate 10 of an electrooptic device according to a third embodiment of the invention. Since the basic configuration of this embodiment is the same as that of the first embodiment, like component are given the same numerals and their description will be omitted.

As shown in FIG. 7, also in this embodiment, the protection circuit 105 for the pixel array region 10*b* and the scanning-line driving circuit 104 is disposed in the region opposite to the scanning-line driving circuit 104 with respect to the pixel array region 10*b*, and the protection circuit 105 is electrically connected to the second end 3*d* of the scanning line 3*a*. That is, the protection circuit 105 has the third power line 6*s* for supplying the third source voltage VHH and the fourth power line 6*t* for supplying the fourth source voltage VLL as electrostatic discharging electric paths. Between the second end 3*d* of the scanning line 3*a* and the third power line 6*s* and between the second end 3*d* of the scanning line 3*a* and the fourth power line 6*t* are provided diode devices 41 and 42. This embodiment has a first resistor 43 for reducing rush current to the diode devices 41 and 42 at the second end 3*d* of the scanning line 3*a* and between the pixel array region 10*b* and the diode devices 41 and 42.

Unlike the first and second embodiments, this embodiment has no resistor between the pixel array region 10*b* and the scanning-line driving circuit 104 at the first end 3*c* of the scanning line 3*a*. However, the resistance of per unit length of the whole or part of the portion of the scanning line 3*a* from the center of the length to the scanning-line driving circuit 104 is higher than that of the portion from the center of the length of the scanning line 3*a* to the diode devices 41 and 42.

For example, all the portion from the center of the length of the scanning line 3*a* to the diode devices 41 and 42 is wide, while the portion from the center of the length of the scanning line 3*a* to the scanning-line driving circuit 104 is narrow except the portion overlapping with the channel region 1*a*' as the gate electrode of the thin-film transistor 30.

On the device substrate 10 is formed metal film, ITO film, and semiconductor film for the thin-film transistors 30, 80, and 90 and the pixel electrode 9*a*, whose resistances have the following relation:

metal film<ITO film<semiconductor film.

Accordingly, all the portion of the scanning line 3*a* from the center of the length to the diode devices 41 and 42 may be made of metal film, while the portion of the scanning line 3*a* from the center of the length to the scanning-line driving circuit 104 may be made of ITO film or semiconductor film doped with impurities except the portion overlapping with the channel region 1*a*' as the gate electrode of the thin-film transistor 30.

With such a structure, even if the resistor 48 is disposed at the second end 3*d* of the scanning line 3*a* and between the pixel array region 10*b* and the diode devices 41 and 42, the resistance of the portion of the scanning line 3*a* from the center of the length to the scanning-line driving circuit 104 is higher than that of the portion of the scanning line 3*a* from the center of the length to the diode devices 41 and 42. Accordingly, as in the first and second embodiments, even if static electricity enters the scanning line 3*a*, the static electricity flows preferentially to the protection circuit 105 along the scanning line 3*a*, and little static electricity flows to the scanning-line driving circuit 104. Therefore, this embodiment allows the pixel array region 10*b* to be protected from the static electricity flowing into the pixel array region 10*b*, and also the scanning-line driving circuit 104 to be surely protected.

Other Embodiments

The foregoing embodiments have the rush-current preventing resistors 43 and 48 in the stage preceding the diode devices 41 and 42. As an alternative, the invention may be applied to an electrooptic device without the rush-current preventing resistors 43 and 48. While the foregoing embodiments use PIN junction diodes as the diode devices 41, 42, 44, and 45, a MOS diode having a diode-connected N-type thin-film transistor or a MOS diode having a diode-connected P-type thin-film transistor may be used. In this case, even if the driving circuit is formed of an N-type or P-type thin-film transistor, a MOS diode can be configured.

Any of the embodiments have a protection circuit for the scanning-line driving circuit 104. The invention may also be applied to a structure in which a protection circuit is provided for the data-line driving circuit 101 or a structure in which a protection circuit is provided for both of the scanning-line driving circuit 104 and the data-line driving circuit 101.

While the foregoing embodiments have been described using a liquid crystal device as an electrooptic device, the invention may also be applied to an electrooptic device using an electrooptic material other than liquid crystal, for example, to an organic electroluminescent device.

Examples of Electronic Device

Figure 8A:
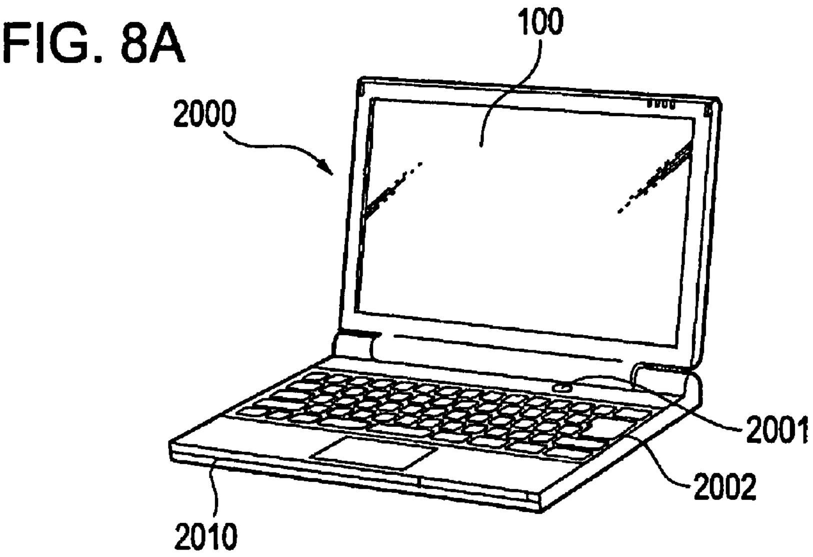
FIG. 8A shows the structure of a mobile personal computer equipped with an electrooptic device according to an embodiment of the invention.
Figure 8B:
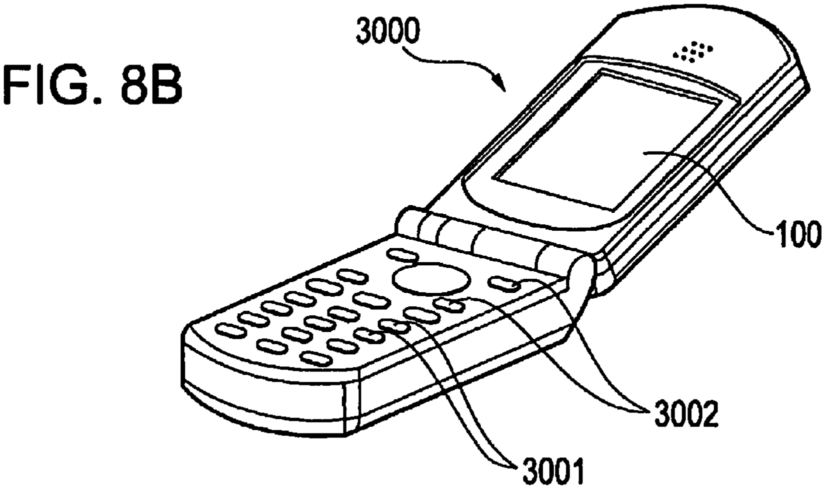
FIG. 8B shows the structure of a portable phone equipped with an electrooptic device according to an embodiment of the invention.
Figure 8C:
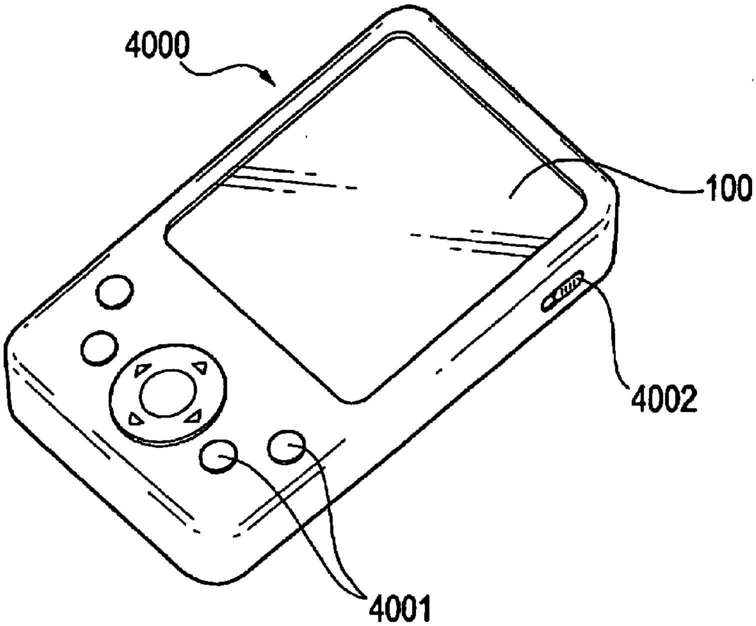
FIG. 8C shows the structure of a personal digital assistant (PDA) incorporating an electrooptic device according to an embodiment of the invention.
Figure 9A:
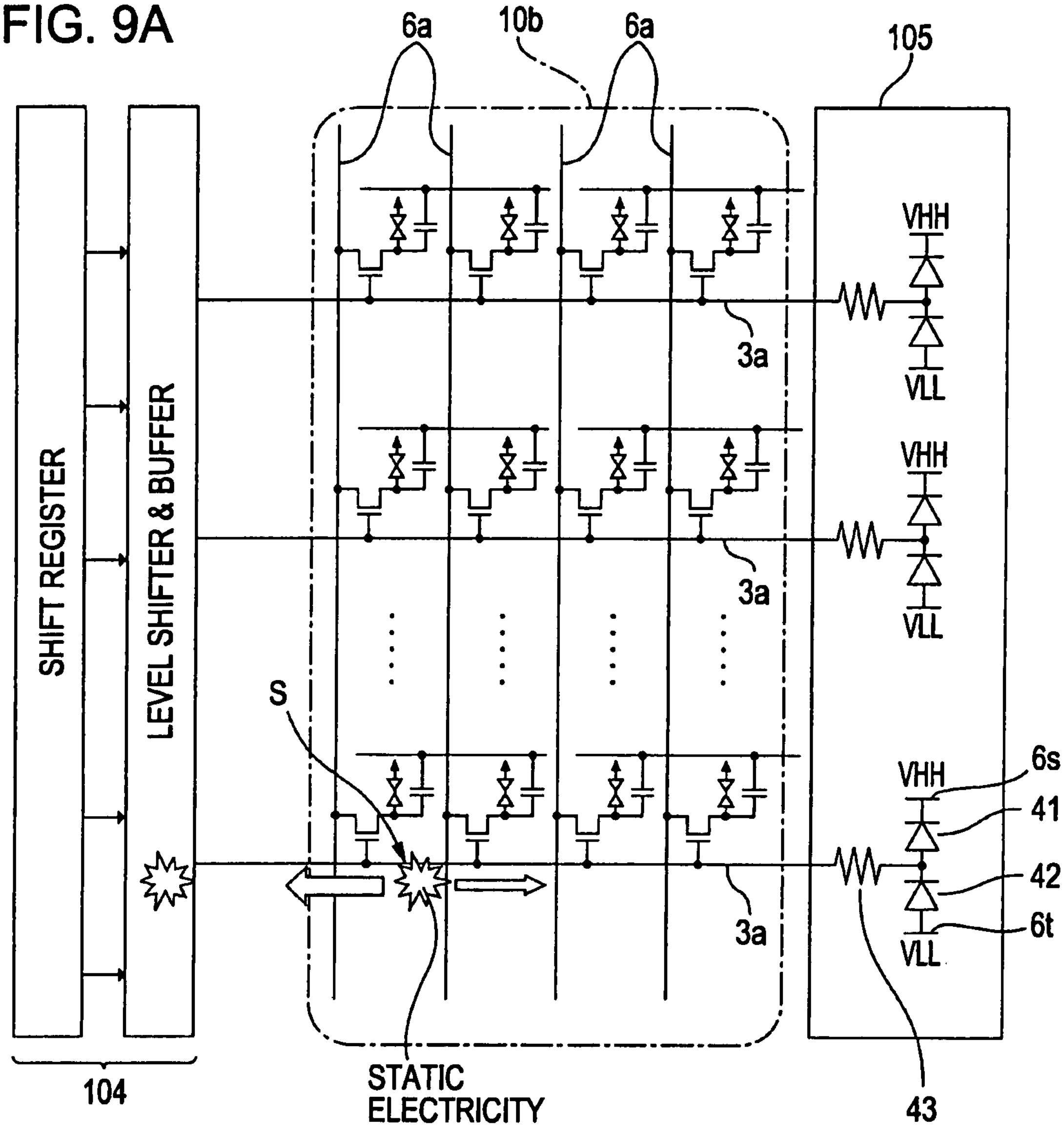
FIG. 9A is a block diagram of a scanning-line driving circuit and a protection circuit of an electrooptic device according to a comparative example.
Figure 9B:
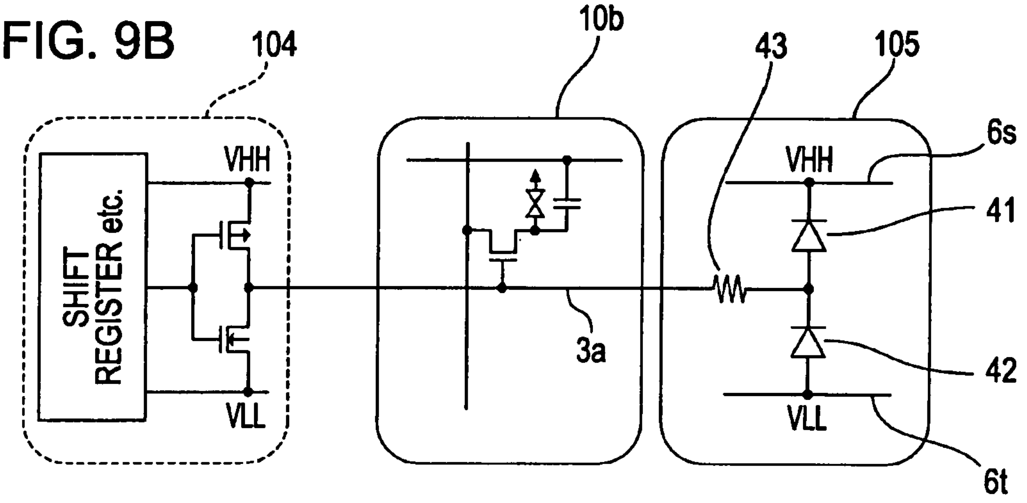
FIG. 9B is a block diagram of one unit of FIG. 9A.

Electronic devices incorporating the electrooptic device 100 according to the foregoing embodiments will be described. FIG. 8A shows the structure of a mobile personal computer 2000 equipped with the electrooptic device 100. The personal computer 2000 includes the electrooptic device 100 serving as a display unit and a main body 2010. The main body 2010 has a power switch 2001 and a keyboard 2002. FIG. 8B shows the structure of a portable phone 3000 equipped with the electrooptic device 100. The portable phone 3000 includes a plurality of operation buttons 3001, scroll buttons 3002, and the electrooptic device 100 serving as a display unit. A screen displayed on the electrooptic device 100 is scrolled by operating the scroll buttons 3002. FIG. 8C shows the structure of a personal digital assistant (PDA) 4000 incorporating the electrooptic device 100. The PDA 4000 includes a plurality of operation buttons 4001, a power switch 4002, and the electrooptic device 100 serving as a display unit. When the power switch 4002 is turned on, various information such as an address book or a schedule book is displayed on the electrooptic device 100.

Examples of electronic devices incorporating the electrooptic device 100 are, in addition to those shown in FIGS. 8A to 8C, digital still cameras, liquid crystal TVs, viewfinder or monitor-direct-view type videotape recorders, car navigation systems, pagers, electronic notebooks, calculators, word processors, workstations, TV phones, POS terminals, and devices having a touch panel. The electrooptic device 100 can be applied as the display of such various electronic devices.

The entire disclosure of Patent Application No. 2007-9881, filed Jan. 19, 2007 is expressly incorporated by reference herein.

What is claimed is:

1. An electrooptic device comprising:

a plurality of parallel signal lines provided in a pixel array region in which a plurality of pixels is arrayed;

a driving circuit electrically connected to a first end of each of the signal lines outside the pixel array region; and a protection circuit in which a diode device is electrically connected to a second end of the signal line, the diode device dissipating static electricity from the signal line, wherein the resistance of the portion of the signal line from the center of the length to the driving circuit is higher than that of the portion of the signal line from the center to the diode device, wherein the resistance of the portion of the signal line from the center of the length to the diode device is implemented by a first resistor device disposed at the portion of the signal line between the pixel array region and the diode device, the resistance of the portion of the signal line from the center to the driving circuit is implemented by a second resistor device disposed at the portion of the signal line between the pixel array region and the driving circuit, a first resistance of the first resistor device and a second resistance of the second resistor device set at predetermined resistances, and when static electricity flows into the signal line, the static electricity flows preferentially to the diode device along the signal line and little static electricity flows to the driving circuit along the signal line wherein the first resistor device and the second resistor device are formed by implanting one of low-concentration N-type impurities and low-concentration P-type impurities into a semiconductor film.

2. The electrooptic device according to claim 1, wherein the pixel has a pixel-switching thin-film transistor and a pixel electrode;

the driving circuit has a complementary thin-film transistor; and the signal line and the diode device are made of a plurality of thin films that constitute the pixel-switching thin-film transistor, the pixel electrode, and the complementary thin-film transistor.

3. The electrooptic device according to claim 1, wherein the diode device is a PIN junction diode.

4. The electrooptic device according to claim 1, wherein:

the diode device is an N-type or P-type diode; and the driving circuit includes an N-type or P-type thin-film transistor.

5. An electrooptic device comprising:

a plurality of parallel signal lines provided in a pixel array region in which a plurality of pixels is arrayed;

a driving circuit electrically connected to a first end of each of the signal lines outside the pixel array region;

a protection circuit in which a diode device is electrically connected to a second end of the signal line, the diode device dissipating static electricity from the signal line;

a first resistor device disposed at the portion of the signal line between the pixel array region and the diode device; and a second resistor device disposed at the portion of the signal line between the pixel array region and the driving circuit, a first resistance of the first resistor device and a second resistance of the second resistor device set at predetermined resistances, the second resistance arranged to be higher than the first resistance, wherein the first resistor device and the second resistor device are formed by implanting one of low-concentration N-type impurities and low-concentration P-type impurities into a semiconductor film.

6. The electrooptic device according to claim 5, wherein the pixel has a pixel-switching thin-film transistor and a pixel electrode;

the driving circuit has a complementary thin-film transistor; and the signal line, the diode device, the first resistor, and the second resistor are made of a plurality of thin films that constitute the pixel-switching thin-film transistor, the pixel electrode, and the complementary thin-film transistor.

7. An electrooptic device comprising:

a plurality of parallel signal lines provided in a pixel array region in which a plurality of pixels is arrayed;

a driving circuit electrically connected to a first end of each of the signal lines outside the pixel array region;

a first protection circuit in which a first diode device is electrically connected to a second end of the signal line, the first diode device dissipating static electricity from the signal line;

a second protection circuit in which a second diode device is electrically connected to the portion of the signal line between the pixel array region and the driving circuit at the first end of the signal line, the second diode device dissipating static electricity from the signal line;

a first resistor device disposed at the portion of the signal line between the pixel array region and the first diode device; and a second resistor device disposed at the portion of the signal line between the pixel array region and the second diode device, a first resistance of the first resistor device and a second resistance of the second resistor device set at predetermined resistances, the second resistance arranged to be higher than the first resistance, wherein the first resistor device and the second resistor device are formed by implanting one of low-concentration N-type impurities and low-concentration P-type impurities into a semiconductor film.

* * * * *